(12) United States Patent
Kitagawa et al.

(10) Patent No.: US 8,305,011 B2
(45) Date of Patent: Nov. 6, 2012

(54) DRIVING CIRCUIT FOR LIGHT EMITTING ELEMENTS

(75) Inventors: Atsushi Kitagawa, Kyoto (JP); Kunihiro Komiya, Kyoto (JP)

(73) Assignee: Rohm Co., Ltd. (JP)

( * ) Notice: Subject to any disclaimer, the term of this patent is extended or adjusted under 35 U.S.C. 154(b) by 247 days.

(21) Appl. No.: 12/667,879

(22) PCT Filed: Jul. 3, 2008

(86) PCT No.: PCT/JP2008/001778
§ 371 (c)(1),
(2), (4) Date: Jan. 6, 2010

(87) PCT Pub. No.: WO2009/008141
PCT Pub. Date: Jan. 15, 2009

(65) Prior Publication Data
US 2010/0194294 A1    Aug. 5, 2010

(30) Foreign Application Priority Data
Jul. 6, 2007   (JP) ................................. 2007-178937

(51) Int. Cl.
*H05B 37/02* (2006.01)
(52) U.S. Cl. .......................... 315/307; 315/297; 315/312
(58) Field of Classification Search .......... 315/224–226, 315/287, 291, 297, 307, 312
See application file for complete search history.

(56) References Cited

U.S. PATENT DOCUMENTS

| | | | | |
|---|---|---|---|---|
| 2001/0043166 A1* | 11/2001 | Jacobsen et al. | ................ | 345/27 |
| 2002/0105373 A1* | 8/2002 | Sudo | ............................. | 327/538 |
| 2005/0088207 A1* | 4/2005 | Rader et al. | .................. | 327/109 |
| 2005/0104542 A1* | 5/2005 | Ito et al. | ......................... | 315/291 |
| 2005/0128168 A1* | 6/2005 | D'Angelo | ........................ | 345/82 |
| 2007/0103098 A1 | 5/2007 | Shiotsu et al. | | |
| 2007/0120506 A1* | 5/2007 | Grant | .............................. | 315/312 |
| 2007/0273681 A1* | 11/2007 | Mayell | ............................ | 345/211 |
| 2008/0001547 A1* | 1/2008 | Negru | ............................ | 315/189 |

FOREIGN PATENT DOCUMENTS

DE    102006052016 A1    6/2007
FR    2893214 A1    5/2007

(Continued)

OTHER PUBLICATIONS

International Preliminary Report for PCT/JP2008/001778 mailed Feb. 4, 2010 with English translation.

(Continued)

*Primary Examiner* — Tung X Le
(74) *Attorney, Agent, or Firm* — Cantor Colburn LLP

(57) ABSTRACT

Multiple LED terminals are provided to multiple LEDs, respectively. Each of these LED terminals is connected to the anode of the corresponding LED. A booster circuit boosts an input voltage. Multiple constant current sources are provided to the multiple LEDs, respectively. One terminal of each of the constant current sources is connected to the corresponding one of the LEDs via the corresponding one of the LED terminals. Multiple switches are provided to the multiple constant current sources, respectively, each of which selectively outputs a voltage selected from the input voltage and the output voltage of the booster circuit to the corresponding constant current source. A control circuit monitors each of the voltages at the multiple LED terminals, and controls the connection state of each of the switches based upon the corresponding voltage.

9 Claims, 4 Drawing Sheets

| | FOREIGN PATENT DOCUMENTS | |
|---|---|---|
| JP | 2003-158299 A | 5/2003 |
| JP | 2005-196556 A | 7/2005 |
| JP | 2005-260110 A | 9/2005 |
| JP | 2007-123627 A | 5/2007 |
| JP | 2007-126041 A | 5/2007 |
| JP | 2007-134405 A | 5/2007 |
| WO | 2006/057213 A1 | 6/2006 |

OTHER PUBLICATIONS

International Search Report for PCT/JP2008/001778 mailed Aug. 5, 2008 with English translation.

* cited by examiner

DRIVING CIRCUIT FOR LIGHT EMITTING ELEMENTS

CROSS REFERENCE TO RELATED APPLICATIONS

This is a U.S. national stage application of International Application No. PCT/JP2008/001778, filed on 3 Jul. 2008. Priority under 35 U.S.C. §119(a) and 35 U.S.C. §365(b) is claimed from Japanese Application No. JP2007-178937, filed 6 Jul. 2007, the disclosure of which is also incorporated herein by reference.

BACKGROUND OF THE INVENTION

1. Field of the Invention

The present invention relates to a driving circuit for driving multiple light emitting elements.

2. Description of the Related Art

Battery-driven electronic apparatuses such as cellular phones, PDAs (Personal Digital Assistants), etc., mount a device which requires higher voltage than the output voltage of a battery, such as an LED (Light Emitting Diode) employed as a backlight for a liquid crystal panel, etc. For example, in many cases, such an electronic apparatus employs a lithium ion battery which supplies an output voltage of around 3.5 V in the normal state, and an output voltage of around 4.2 V even in the fully charged state. However, a higher voltage than the battery voltage is required as the driving voltage for the LED. In a case in which such a higher voltage than the battery voltage is required, the battery voltage is boosted using a switching regulator or a charge pump circuit so as to obtain the voltage necessary for driving a load circuit such as LED etc. The related art is disclosed in Patent document 1.

[Patent Document 1]

Japanese Patent Application Laid Open No. 2005-260110

In the circuit described in Patent document 1, of the LEDs for the three colors R, G, and B, the LEDs for G and B are driven using the boosted voltage, and the LEDs for R are driven using the voltage which is switched between the battery voltage and the boosted voltage.

SUMMARY OF THE INVENTION

The present invention has been made in view of such a situation. Accordingly, it is a general purpose of the present invention to provide a driving circuit which is capable of driving multiple light emitting elements with high efficiency.

An embodiment of the present invention relates to a driving circuit which drives multiple light emitting elements. The driving circuit includes: multiple driving terminals which are respectively provided to the multiple light emitting elements, and each of which is to be connected to the anode of the corresponding light emitting element; a booster circuit which boosts an input voltage; multiple constant current sources which are respectively provided to the multiple light emitting elements, and one terminal of each of which is connected to the corresponding driving terminal; multiple switches which are respectively provided to the multiple constant current sources, and each of which selectively outputs a voltage selected from the input voltage and the output voltage of the booster circuit to the corresponding constant current source; and a control circuit which monitors the voltage at each of the multiple driving terminals, and which controls the connection state of each of the switches based upon the voltage at the corresponding driving terminal. The driving circuit is monolithically integrated on a single semiconductor substrate.

With such an embodiment, each of the light emitting elements can be driven using a driving voltage which can be switched between the battery voltage and the output voltage of the booster circuit for each light emitting element. Thus, such an arrangement provides improved high efficiency. Furthermore, the constant current sources for driving the light emitting elements are provided on the anode side of the light emitting elements. Thus, such an arrangement avoids an increase in the number of terminals, thereby avoiding an increase in the circuit area.

Also, the control circuit may control the connection state of each of the switches based upon the voltage across the constant current source connected to the corresponding driving terminal.

Also, the control circuit may include multiple comparators which are respectively provided to the multiple driving terminals, and each of which compares the voltage across the corresponding constant current source with a predetermined threshold voltage. Also, the control circuit may switch the connection state of each of the switches based upon the output of the corresponding comparator.

Also, the control circuit may include multiple comparators respectively provided to the multiple driving terminals, and may switch the connection state of each of the switches based upon the output of the corresponding comparator. Also, when the switch that corresponds to the driving terminal outputs the input voltage, the corresponding comparator may compare the voltage difference between the voltage at the driving terminal and the input voltage with a predetermined first threshold voltage. Furthermore, when the switch that corresponds to the driving terminal outputs the output voltage of the booster circuit, the corresponding comparator may compare the voltage difference between the voltage at the driving terminal and the output voltage of the booster circuit with a predetermined second threshold voltage.

Also, when the switch outputs the input voltage, the corresponding comparator may compare the voltage at the corresponding driving terminal with the voltage which has dropped from the input voltage by the predetermined first threshold voltage. Furthermore, when the switch outputs the output voltage of the booster circuit, the corresponding comparator may compare the voltage at the corresponding driving terminal with the voltage which has dropped from the output voltage of the booster circuit by the predetermined second threshold voltage.

With such an arrangement, the voltage drop that occurs at the switch and the constant current source can be compared with the threshold voltage, regardless of the connection state of the switch.

Also, the booster circuit may be a charge pump circuit having multiple switchable boost ratios. Also, the control circuit may switch the boost ratio of the charge pump circuit based upon the voltages at the multiple driving terminals.

Also, the booster circuit may be a switching regulator. Also, the control circuit may adjust the output voltage of the switching regulator using a feedback operation based upon the voltages at the multiple driving terminals.

Another embodiment of the present invention relates to an electronic apparatus. The electronic apparatus includes: a battery; multiple light emitting elements; and the above-described driving circuit which receives the voltage of the battery as the input voltage, and which drives the multiple light emitting elements.

It is to be noted that any arbitrary combination or rearrangement of the above-described structural components and so forth is effective as and encompassed by the present embodiments.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not affect the electric connection therebetween, in addition to a state in which the member A is physically and directly connected to the member B.

In the same way, the state represented by the phrase "the member C is provided between the member A and the member B" includes a state in which the member A is indirectly connected to the member C, or the member B is indirectly connected to the member C via another member that does not affect the electric connection therebetween, in addition to a state in which the member A is directly connected to the member C, or the member B is directly connected to the member C.

Figure 1:
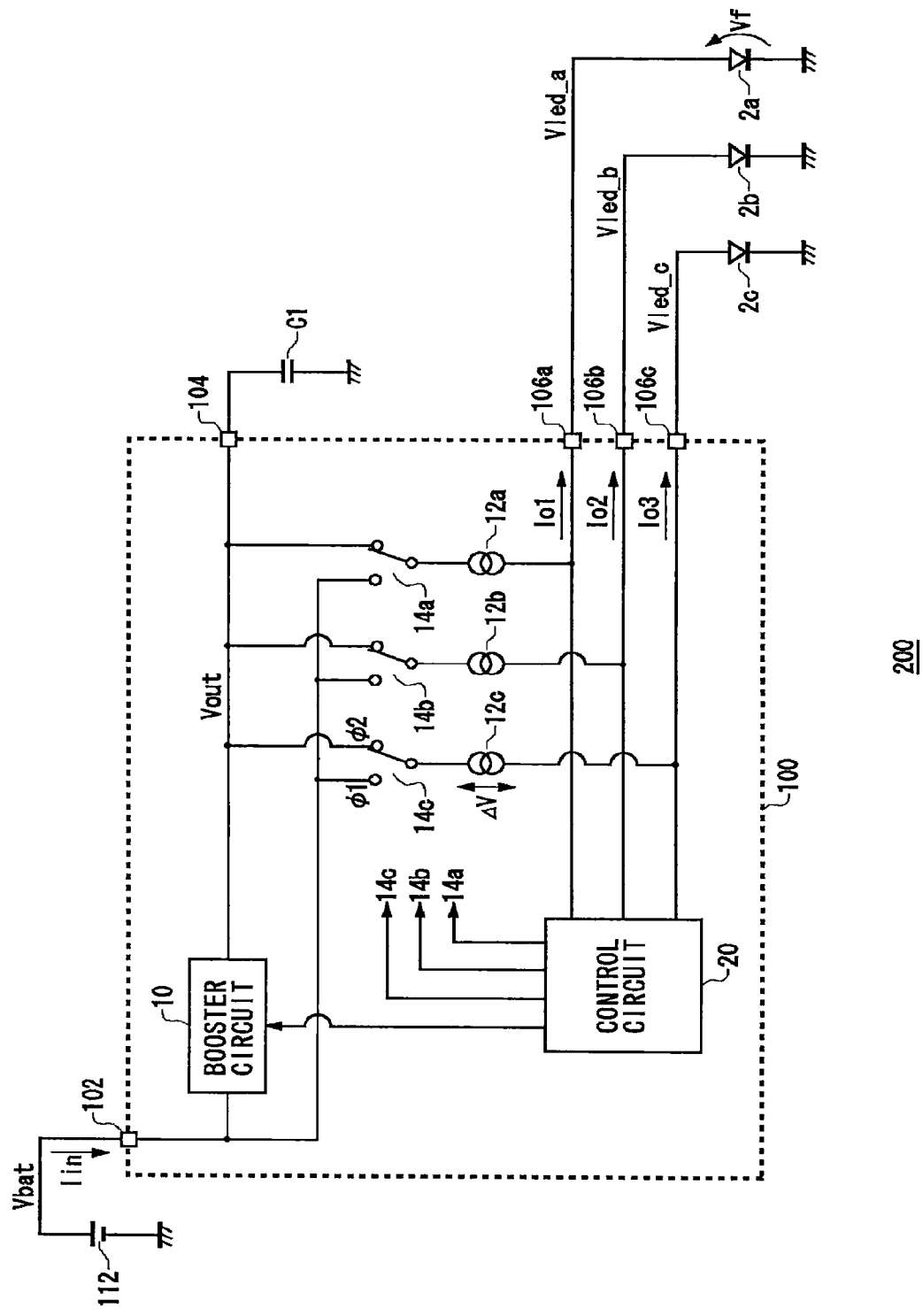
FIG. 1 is a circuit diagram which shows a light emitting apparatus according to an embodiment of the present invention.

FIG. 1 is a circuit diagram which shows a light emitting apparatus 200 according to an embodiment of the present invention. The light emitting apparatus 200 is mounted on an electronic apparatus such as a cellular phone terminal, PDA, etc., and is used as a backlight/illumination for a liquid crystal panel, and illumination for indicating an incoming call. The light emitting apparatus 200 includes: multiple LEDs 2a through 2c (which will collectively be referred to as "LEDs 2" hereafter as appropriate) which are used as light emitting elements; a driving circuit 100 which drives the LEDs; and a battery 112 as a power supply. The battery 112 is a secondary battery which outputs a battery voltage Vbat that changes according to the charged state. The driving circuit 100 receives the battery voltage Vbat as a power supply, and drives the LEDs 2a through 2c. Description will be made below, assuming that the LEDs 2a through 2c are white LEDs with a forward voltage Vf of around 3.4 V, and the battery 112 is a lithium ion battery which outputs a battery voltage Vbat of around 3 V through 4.2 V.

The principal components of the driving circuit 100 are integrated on a single semiconductor substrate. The driving circuit 100 includes an input terminal 102, an output terminal 104, and multiple LED driving terminals (which will be referred to as "LED terminals 106a through 106c" hereafter, and will also collectively be referred to as "LED terminals 106" as appropriate). The battery voltage Vbat is supplied to the input terminal 102 as the input voltage. An output capacitor C1 is connected to the output terminal 104, which outputs a boosted voltage Vout obtained by boosting the battery voltage Vbat. The LED terminals 106a through 106c are provided to the multiple LEDs 2a through 2c, respectively. The LED terminals 106a through 106c are connected to the anode of the corresponding LEDs 2a through 2c, respectively.

The driving circuit 100 includes a booster circuit 10, constant current sources 12a through 12c, switches 14a through 14c, and a control circuit 20. The booster circuit 10 is a circuit which boosts the input voltage Vbat. A charge pump circuit or a switching regulator is suitably employed as the booster circuit 10. Description will be made below regarding an arrangement in which a charge pump circuit with a boost ratio of 1.5 is employed as the booster circuit 10. It should be noted that the number of LEDs 2, and the number of the corresponding constant current sources 12, and the number of the switches 14, is not restricted to three. Rather, a desired number of such components may be employed.

The constant current sources 12a through 12c (which will collectively be referred to as "constant current sources 12" hereafter as appropriate) are provided to the multiple LEDs 2a through 2c, respectively. One terminal of each of the constant current sources 12a through 12c is connected to the respective LEDs 2a through 2c via the corresponding LED terminals 106a through 106c.

The multiple switches 14a through 14c are provided to the multiple constant current sources 12a through 12c, respectively. The switches 14a through 14c selectively output the input voltage Vbat or the output voltage Vout of the booster circuit 10 to the corresponding constant current sources 12a through 12c, respectively. The connection state of each of the switches 14a through 14c can be controlled in a mutually independent manner. Hereafter, the state in which the switch 14 switches the connection of the input voltage Vbat side to the ON state will be referred to as the "first state φ1", and the state in which switch 14 switches the connection of the output voltage Vout side to the ON state will be referred to as the "second state φ2".

The control circuit 20 monitors each of the voltages (which will be referred to as "LED voltages Vled_a through Vled_c" hereafter) at the multiple LED terminals 106a through 106c, and controls the connection state of the switches 14a through 14c based upon the LED voltages Vled_a through Vled_c at the respective LED terminals 106a through 106c.

Description will be made regarding the control operation of the control circuit 20 for the switches 14. In the initial state, the control circuit 20 sets all the switches 14a through 14c to the first state φ1, thereby switching the connection of the input voltage Vbat side to the ON state.

In order for the LEDs 2 to produce a desired luminance, there is a need to supply a current that corresponds to the desired luminance. In order for the constant current source 12 to stably supply a constant current that corresponds to the desired luminance, a transistor provided on a current path within the constant current source 12 must operate in a constant current range. That is to say, there is a need to ensure that the voltage (i.e., voltage drop) ΔV across the constant current source 12 is maintained at a certain threshold voltage Vth or more. The constant current range means a range in which the drain current (collector current) does not depend on the drain-source voltage (collector-emitter voltage), which corresponds to the saturation range of the field-effect transistor or the active range of the bipolar transistor. The voltage at which the constant current source 12 stably operates depends on the form of the constant current circuit, the kind of transistor employed, and the size thereof. Here, let us say that, when the voltage ΔV between both terminals is equal to or greater than Vth (=0.2 V), the constant current source 12 is capable of generating a stable constant current.

The control circuit 20 monitors the LED voltages Vled_a through Vled_c at the LED terminals 106a through 106c, and checks whether or not a voltage drop of Vth (=0.2 V) or more is being generated for each of the constant current sources 12a through 12c. Let us consider a case in which the battery 112 is in the fully-charged state (Vbat>approximately 4 V), and the forward voltage Vf of the LED 2 is 3.4 V. In this case, if the voltage drop across the switch 14 is ignored, the voltage $\Delta V$ between both terminals of each of the constant current sources 12a through 12c is around 0.6 V, which is greater than the threshold voltage Vth (=0.2 V) for each constant current source. In practice, the voltage $\Delta V$ between both terminals of the constant current source 12 is obtained by subtracting the voltage drop across the switch 14 due to the ON resistance. Description will be made below regarding an arrangement in which the ON resistance of the switch 14 can be ignored in order to simplify the explanation.

In a case in which the input voltage Vbat is smaller than 3.6 V, and accordingly, in a case in which the voltage $\Delta V$ between both terminals of the constant current source 12c is smaller than the threshold voltage Vth (=0.2 V), the switch 14c that corresponds to the constant current source 12c is switched to the second state $\phi 2$, thereby switching the connection to the output voltage Vout side of the booster circuit 10. When the input voltage Vbat is 3.6 V, the output voltage Vout of the booster circuit 10 is 5.4 V. Accordingly, the voltage $\Delta V$ between both terminals of the constant current source 12c again becomes equal to or greater than 0.2 V, thereby supplying a stable constant current to the LED 2c.

With the present embodiment, each of the LEDs 2 is driven using voltage which is switched between the input voltage Vbat and the output voltage Vout of the booster circuit 10, thereby providing high efficiency.

Description will be made regarding the improved efficiency of the embodiment with actual values. Even in an arrangement in which identical white LEDs are employed, there are irregularities in the forward voltage Vf, i.e., the white LEDs do not have a uniform forward voltage. For example, in a state in which the same current flows through the white LEDs, the white LEDs could provide different forward voltages Vf of 3.2 V, 3.4 V, and 3.6 V. Assuming that the battery voltage Vbat is 3.6 V in this stage, the voltages $\Delta V$ between both terminals of the constant current sources 12a, 12b, and 12c are 0.4 V, 0.2 V, and 0 V, respectively. Accordingly, although the LED 2c cannot be driven, the LEDs 2a and 2b can be driven. In this case, with the driving circuit 100 according to the present embodiment, only the LED 2c is driven by the booster circuit 120, and the other LEDs 2a and 2b are driven using the input voltage Vbat.

With the currents that flow through the LEDs 2a through and 2c as Io1, Io2, and Io3, respectively, the input current Iin that flows from the battery 112 to the input terminal 102 is represented by the following Expression: Iin=Io1×1.0+Io2×1.0+Io3×1.5. The reason why only Io3 is multiplied by 1.5 is that the boost ratio of the charge pump circuit is 1.5. Assuming that Io1=Io2=Io3=20 mA, the input current Iin is 70 mA.

Let us consider an arrangement in which, instead of providing the multiple switches 14a through 14c, a single switch is provided which supplies the same voltage to all the constant current sources 12a through 12c, which is switched between the input voltage Vbat and the output voltage Vout. With such an arrangement, all the LEDs must be driven using the output voltage Vout of the charge pump circuit. Accordingly, the input current Iin is represented by the following Expression: Iin=Io1×1.5+Io2×1.5+Io3×1.5. Assuming that Io1=Io2=Io3=20 mA, the input current Iin is 90 mA. With the present embodiment, the input current Iin is 70 mA. Accordingly, the present embodiment can reduce such a current of 20 mA. In a case in which the charge pump circuit has a greater boost ratio, this effect becomes more marked.

Furthermore, with the present embodiment, the voltage drop across each of the constant current sources 12a through 12c can be reduced. That is to say, with an arrangement including a single switch, the voltage drops of the constant current sources 12a, 12b, and 12c are 2.2 V, 2.0 V, and 1.8 V, respectively, leading to unnecessary power consumption. On the other hand, with the present embodiment, only the LED 2c is driven using the output voltage Vout of the booster circuit 10. Accordingly, the voltage drops of the constant current sources 12a, 12b, and 12c are 0.4 V, 0.2 V, and 1.8 V, respectively, thereby reducing the power consumption.

As described above, by providing switches 14 in increments of LEDs 2, and by monitoring the voltage $\Delta V$ between both terminals of each of the constant current sources 12, the driving circuit 100 according to the present embodiment provides a high-efficiency driving operation with reduced current consumption.

Furthermore, with the present embodiment, the constant current sources 12a through 12c are provided on the anode side of the LEDs 2a through 2c. As a result, such an arrangement avoids an increase in the number of terminals even in a case in which multiple switches 14a through 14c are provided.

In a case in which the constant current sources 12 are provided on the cathode side of the LEDs 2, there is a need to provide an additional three terminals in order to connect the cathodes of the LEDs 2a through 2c to the respective constant current sources 12a through 12c included within the driving circuit 100. That is to say, there is a need to provide a total of eight terminals, i.e., three anode-connection terminals and three cathode-connection terminals, in addition to the input terminal 102 and the output terminal 104. On the other hand, with the circuit shown in FIG. 1, the constant current sources 12 are provided on the anode side of the LEDs 2. Accordingly, such an arrangement requires a total of only five terminals. That is to say, such an arrangement allows three terminals to be eliminated. It can be readily understood that, in a case in which n (n is an integer) LEDs are employed, n terminals can be eliminated. Thus, such an arrangement provides a marked advantage of avoiding an increase in the circuit area if a great number of LEDs 2 are employed.

Figure 2A:
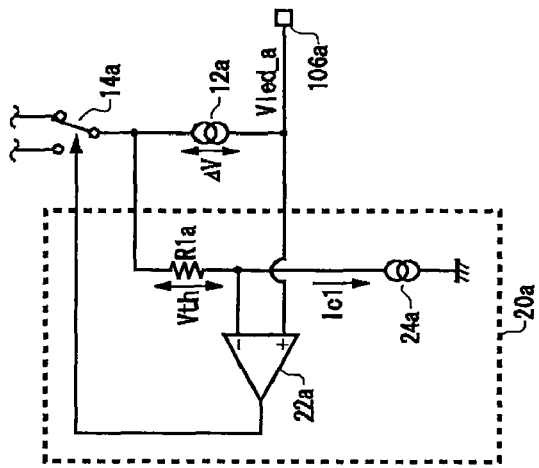
FIGS. 2A and 2B are circuit diagrams which show configuration examples of a control circuit.
Figure 2B:
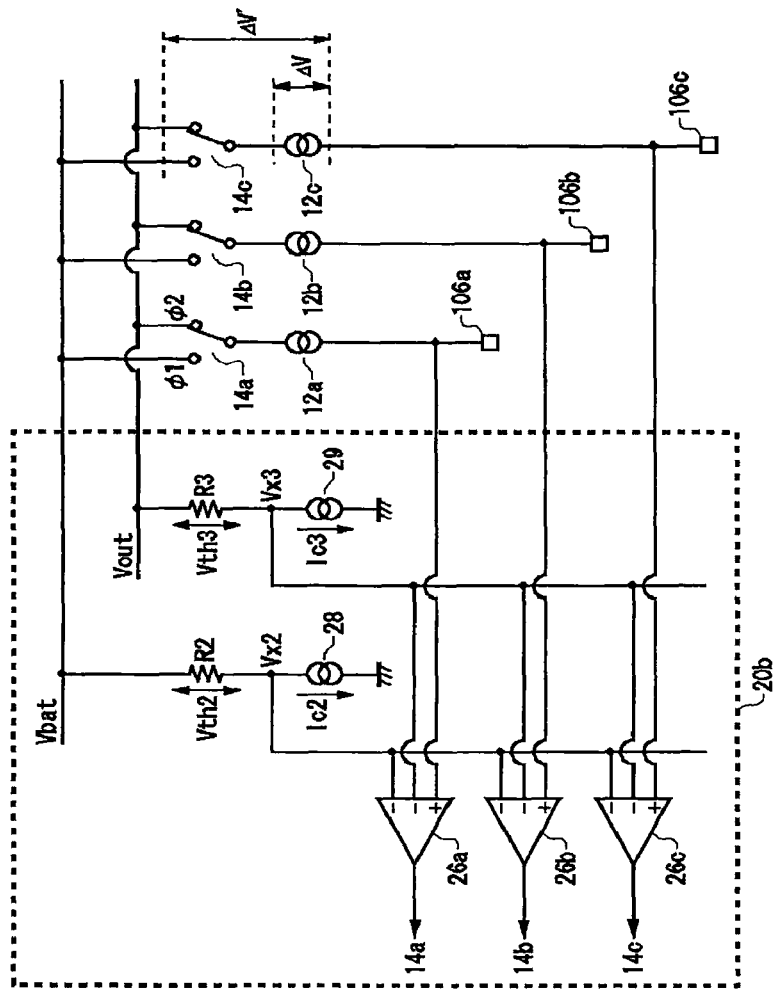

FIGS. 2A and 2B are circuit diagrams which show configuration examples of the control circuit 20. The control circuit 20a shown in FIG. 2A includes a comparator 22a, a resistor R1a, and a current source 24a. The control circuit 20a is a circuit which monitors the voltage $\Delta V$ between both terminals of the constant current source 12a which drives the LED 2a. A circuit having the same configuration is provided to each of the LEDs 2b and 2c.

One terminal of the resistor R1a is connected to one terminal of the switch 14a. That is to say, either the input voltage Vbat or the output voltage Vout of the booster circuit 10 is applied to one terminal of the resistor R1a according to the connection state of the switch 14a. The current source 24a, which generates a constant current Ic1, is provided between the other terminal of the resistor R1a and the ground terminal. The constant current Ic1 generates a voltage drop Vth (=R1a× Ic1) at the resistor R1a. The resistor R1a and the constant current Ic1 are adjusted such that the voltage drop Vth equals 0.2 V. The comparator 22 makes a comparison between the voltage at the other terminal of the resistor R1a and the LED voltage Vled_a.

That is to say, the comparator 22 makes a comparison between the voltage ΔV between both terminals of the constant current source 12a and the voltage drop Vth (=0.2 V) that occurs at the resistor R1a. When ΔV is equal to or greater than Vth, the switch 14a is connected to the input voltage Vbat side, and when ΔV is smaller than Vth, the switch 14a is connected to the output voltage Vout side of the booster circuit 10.

The control circuit 20a shown in FIG. 2A is capable of suitably controlling the connection state of the switch 14a based upon the voltage ΔV between both terminals of the constant current source 12a.

A control circuit 20b shown in FIG. 2B includes a first resistor R2, a second resistor R3, a first current source 28, a second current source 29, and three-input comparators 26a through 26c (which will collectively be referred to as "three-input comparators 26").

When the switch 14, which corresponds to the LED terminal 106, outputs the input voltage Vbat, the three-input comparator 26 compares the voltage difference ΔV' between the LED voltage Vled and the input voltage Vbat with a predetermined first threshold voltage Vth2. Also, when the switch 14, which corresponds to the LED terminal 106, outputs the output voltage Vout of the booster circuit 10, the three-input comparator 26 compares the voltage difference ΔV' between the LED voltage Vled and the output voltage Vout of the booster circuit 10 with a predetermined second threshold voltage Vth3.

When the corresponding switch 14 outputs the input voltage Vbat, the three-input comparator 26 compares the corresponding LED voltage Vled with a voltage Vx2 which has dropped from the input voltage Vbat by the first threshold voltage Vth2. Also, when the corresponding switch 14 outputs the output voltage Vout of the booster circuit 10, the three-input comparator 26 compares the corresponding LED voltage Vled with a voltage Vx3 which has dropped from the output voltage Vout of the booster circuit 10 by the second threshold voltage Vth3.

Specifically, one terminal of the first resistor R2 is connected to the input terminal 102, and accordingly, the input voltage Vbat is applied to this one terminal of the first resistor R2. The first current source 28, which generates a first constant current Ic2, is provided between the other terminal of the first resistor R2 and the ground terminal. The voltage drop Vth2 (=Ic2×R2) is generated at the first resistor R2. Accordingly, the voltage Vx2 at the connection node between the first resistor R2 and the first current source 28 is represented by (Vbat−Vth2).

On the other hand, one terminal of the second resistor R3 is connected to the output terminal 104, and accordingly, the output voltage Vout of the booster circuit 10 is applied to this one terminal of the second resistor R3. The second current source 29, which generates a second constant current Ic3, is provided between the other terminal of the second resistor R3 and the ground terminal. The voltage drop Vth3 (=Ic3×R3) is generated at the second resistor R3. Accordingly, the voltage Vx3 at the connection node between the second resistor R3 and the second current source 29 is represented by (Vout−Vth3).

Each of the three-input comparators 26a through 26c includes two inverting input terminals and one non-inverting input terminal. Each of the three-input comparators 26a through 26c is a circuit which compares the voltage at one terminal selected from the two inverting input terminals with the voltage at the non-inverting input terminal. The two inverting input terminals of the three-input comparator 26a receive the voltage (Vbat−Vth2) and the voltage (Vout−Vth3) as input voltages. The same arrangement is made for the three-input comparators 26b and 26c. The LED voltages Vled_a through Vled_c are applied to the non-inverting input terminals of the three-input comparators 26a through 26c, respectively.

When the switch 14a switches the connection of the input voltage Vbat side to the ON state, the LED voltage Vled_a is represented by the following Expression: Vled_a=Vbat−ΔV'. Here, ΔV' is the voltage between both terminals of a circuit which comprises the switch 14a and the constant current source 12a. That is to say, ΔV' is the sum of the voltage drop that occurs at the switch 14a and the voltage drop that occurs at the constant current source 12a.

Furthermore, when the switch 14a switches the connection of the output voltage Vout side of the booster circuit 10 to the ON state, the LED voltage Vled_a is represented by the following Expression: Vled_a=Vout−ΔV'.

The three-input comparator 26 switches the inverting-terminal voltage to be compared with the LED voltage Vled_a, according to the connection state of the switch 14a. That is to say, in the first state ϕ1 in which the switch 14a switches the connection of the input voltage Vbat side to the ON state, the three-input comparator 26 selects the voltage (Vbat−Vth2) which is generated using the input voltage Vbat as a base voltage, and compares the LED voltage Vled_a with the voltage thus selected. On the other hand, in the second state ϕ2 in which the switch 14a switches the connection of the output voltage Vout side to the ON state, the three-input comparator 26 selects the voltage (Vout−Vth3) which is generated using the output voltage Vout as a base voltage, and compares the LED voltage Vled_a with the voltage thus selected.

As a result, in the first state ϕ1, a comparison is made between the voltage (Vbat−ΔV') and the voltage (Vbat−Vth2). Thus, a comparison is made between the voltage drop ΔV' and the threshold voltage Vth2. In the same way, in the second state ϕ2, a comparison is made between the voltage (Vout−ΔV') and the voltage (Vout−Vth3). As a result, comparison is made between the voltage drop ΔV' and the threshold voltage Vth3.

The voltage drop that occurs at the switch 14a due to the ON resistance will be represented by Von. In this case, by means of a configuration made such that Vth2=Vth3=(Von+Vth), the voltage ΔV between both terminals of the constant current source 12a can be compared with the threshold voltage Vth. For example, if Von=0.2 V and Vth=0.2 V, the configuration should be made such that Vth2=Vth3=0.4 V.

Each of the three-input comparators 26b and 26c operates in the same way as the three-input comparator 26a.

With regard to the circuit shown in FIG. 2A, there is a need to provide the current source 24 and the resistor R1 for each LED. Accordingly, in a case in which n LEDs are employed, there is a need to provide n resistors R1 and n current sources 24. On the other hand, with the circuit shown in FIG. 2B, only a set of the first resistor R2, the second resistor R3, the first current source 28, and the second current source 29 should be provided, even if the number of LEDs is increased. Thus, such an arrangement provides a reduced circuit area.

Figure 3:
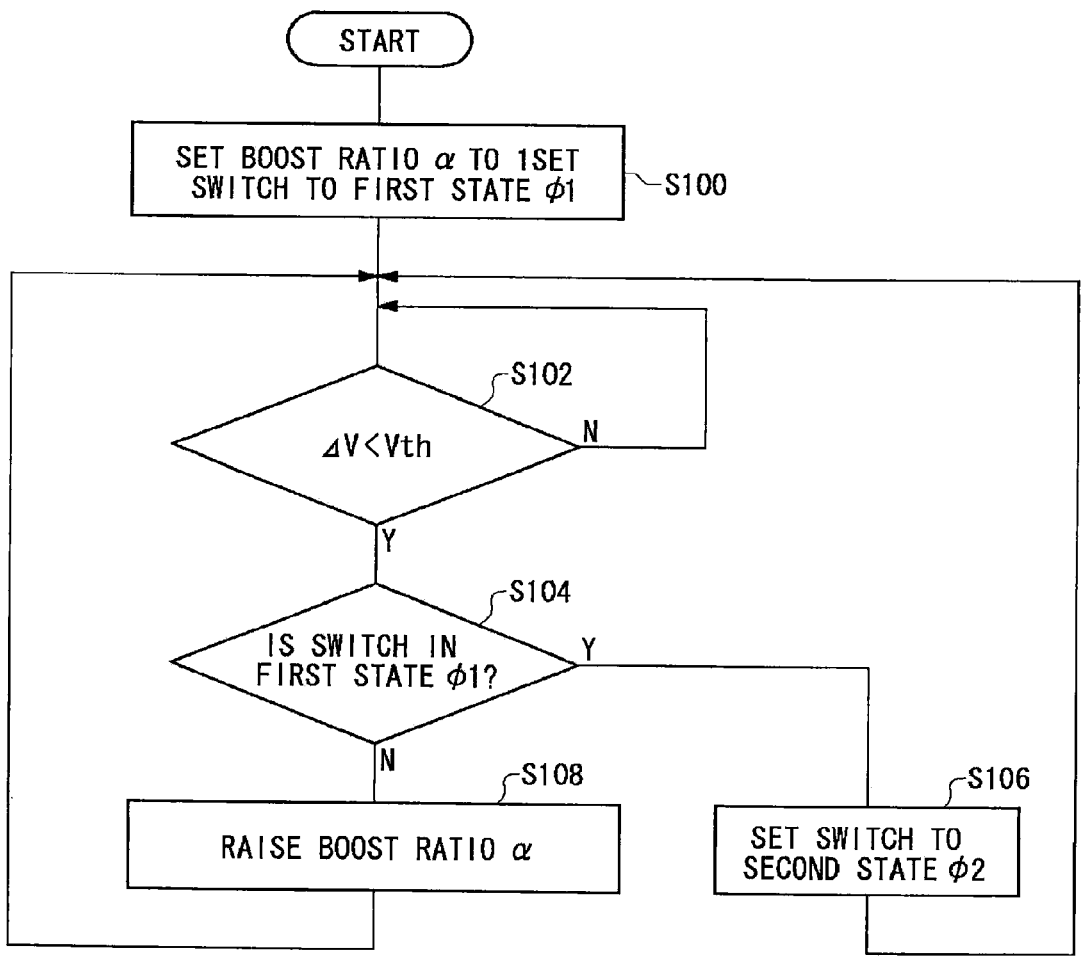
FIG. 3 is a flowchart which shows a first operation sequence for the light emitting apparatus.

Next, returning to FIG. 1, description will be made regarding an arrangement in which the booster circuit 10 is a charge pump circuit having a switchable boost ratio α. With such an arrangement, the control circuit 20 switches the boost ratio α of the charge pump circuit based upon the multiple LED voltages Vled. Let us consider an arrangement in which the boost ratio α can be switched among 1, 1.5, and 2. FIG. 3 is a flowchart which shows a first operation sequence for the light emitting apparatus 200. It should be noted that, in the flowchart shown in FIG. 3 and the flowchart shown in FIG. 4 described later, the order of the steps may be changed as appropriate.

First, after the circuit is started up, the boost ratio α of the charge pump circuit is set to the minimum value (a boost ratio of 1), and all the switches 14 are set to the first state φ1 (S100). Subsequently, in the state in which the LEDs 2a through 2c are operated, the voltage ΔV between both terminals of each switch 14 is monitored. In a case in which determination has been made based upon the monitoring results that ΔV is greater than Vth (in a case of NO in S102), the monitoring operation is continued.

In a case in which ΔV has become smaller than Vth at any one of the constant current sources 12 (in a case of "YES" in S102), the state of the corresponding switch 14, which is connected to the corresponding constant current source 12, is checked (S104). In a case in which determination has been made based upon the checking results that the switch 14 thus checked is in the first state φ1 (in a case of "YES" in S104), the switch 14 is set to the second state φ2 (S106), and the flow returns to Step S102.

In a case in which the switch is in the second state φ2 in Step S104 (in a case of "NO" in S104), the boost ratio α of the charge pump circuit is incremented by one stage (S108). That is to say, the current boost ratio α is maintained, and when the boost ratio α is 1, the boost ratio α is changed to 1.5. When the boost ratio α is 1.5, the boost ratio α is changed to 2. By providing a state machine function to the control circuit 20, the above-described control operation can be performed.

Next, description will be made regarding an arrangement in which the booster circuit 10 is a switching regulator. With an arrangement employing such a switching regulator, the control circuit 20 controls the switching operation using a feedback operation such that the smallest voltage ΔV among the voltages between both terminals of the multiple constant current sources 12 matches a predetermined target value Vref. The target value is set to the same value as the threshold voltage Vth, or is set to a value greater than the threshold voltage Vth.

With the processing according to the flowchart shown in FIG. 3, the control operation for switching the boost ratio α of the charge pump circuit and the control operation for each switch 14 can be suitably executed.

Figure 4:
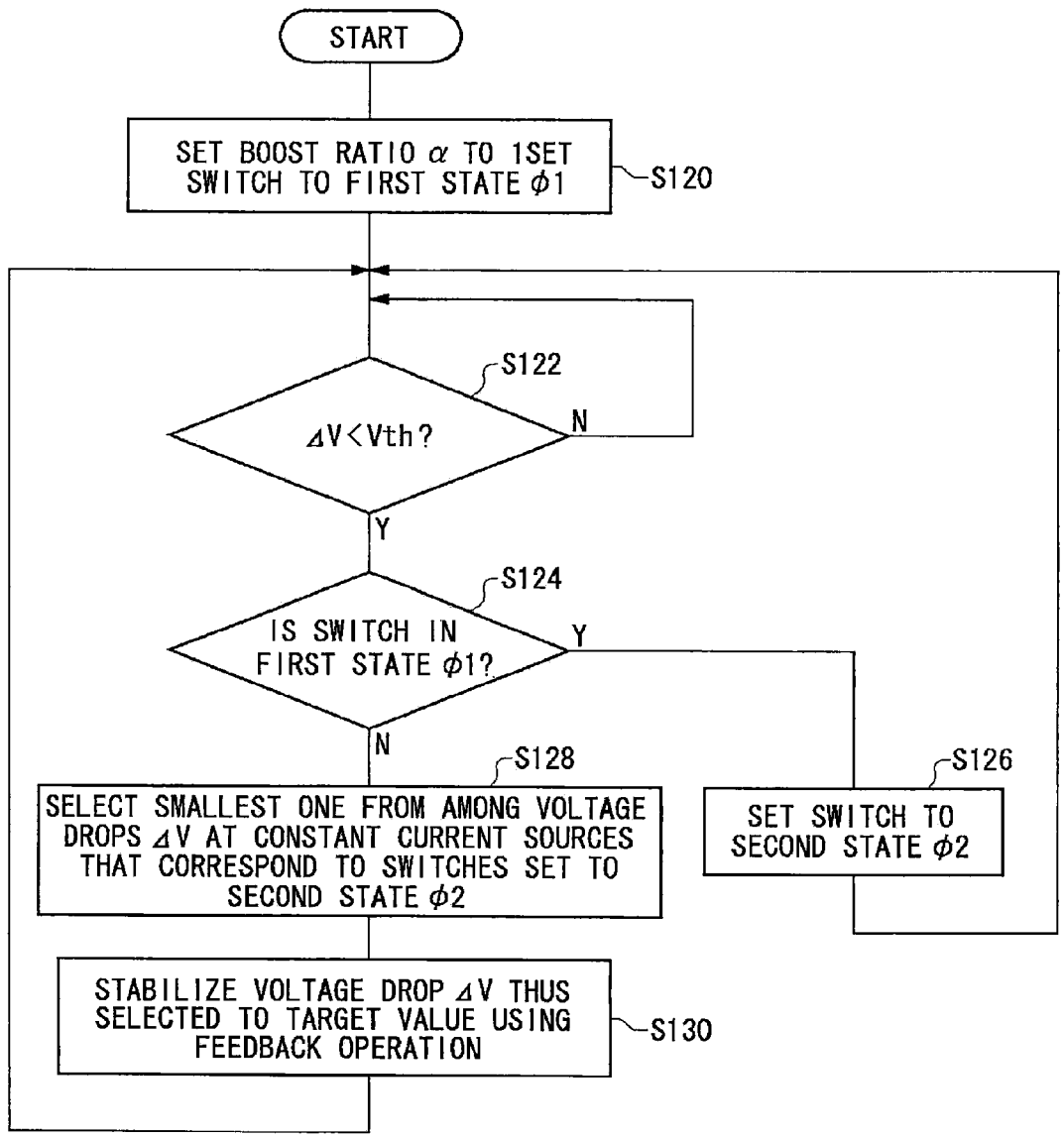
FIG. 4 is a flowchart which shows a second operation sequence for the light emitting apparatus.

FIG. 4 is a flowchart which shows a second operation sequence of the light emitting apparatus 200. The steps S120, S122, S124, and S126 in the flowchart shown in FIG. 4 correspond to the steps S100, S102, S104, and S106, respectively. Accordingly, description thereof will be omitted.

In a case in which the switch is in the first state φ1 in Step S124 (in a case of "YES" in S124), the switch is switched to the second state φ2 (S126). In a case in which the switch is in the second state φ2 in Step S124 (in a case of "NO" in S124), the switching regulator is controlled using a feedback operation such that the voltage ΔV between both terminals of the constant current source 12, which corresponds to the switch 14 set in the second state, matches the target value Vref (S128, S130).

Specifically, in a case in which there are multiple switches 14 set to the second state φ2, first, the smallest voltage is selected from among the voltages ΔV between both terminals of the constant current sources 12 that correspond to these switches 14 (S128). This processing can be performed using a minimum value circuit.

Next, the switching regulator is controlled using the voltage ΔV between both terminals of the selected constant current source 12 as the feedback voltage such that the voltage ΔV matches the target value Vref using pulse width modulation or pulse frequency modulation (S130). Note that the configuration of the control circuit for the switching regulator is known, and accordingly, detailed description thereof will be omitted.

With the processing according to the flowchart shown in FIG. 4, the feedback control operation for the switching regulator and the control operation for each switch 14 can be suitably executed.

The above-described embodiments have been described for exemplary purposes only, and are by no means intended to be interpreted restrictively. Rather, it can be readily conceived by those skilled in this art that various modifications may be made by making various combinations of the aforementioned components or processes, which are also encompassed in the technical scope of the present invention.

Description has been made in the embodiment regarding an arrangement in which each of the LEDs 2a through 2c is a white LED. However, the present invention is not restricted to such an arrangement. Also, an arrangement may be made which employs LEDs for different colors. With such an arrangement employing LEDs for different colors, there is a difference in the forward voltage Vf among the LEDs for different colors. Thus, the present invention is more suitably applied to such an arrangement with more marked effects.

The light emitting elements are not restricted to LEDs. Also, the light emitting elements may be organic EL elements, semiconductor laser elements, or the like.

While the preferred embodiments of the present invention have been described using specific terms, such description is for illustrative purposes only, and it is to be understood that changes and variations may be made without departing from the spirit or scope of the appended claims.

The invention claimed is:

1. A driving circuit which drives a plurality of light emitting elements, comprising:
   a plurality of driving terminals which are respectively provided to the plurality of light emitting elements, and each of which is to be connected to the anode of the corresponding light emitting element;
   a booster circuit which receives an input voltage and boosts the input voltage;
   a plurality of constant current sources which are respectively provided to the plurality of light emitting elements, and one terminal of each of which is connected to the respective light emitting element via the driving terminal;
   a plurality of switches which are respectively provided to the plurality of constant current sources, and each of which receives the input voltage and the output voltage of the booster circuit and selectively applies a voltage selected from the input voltage and the output voltage of the booster circuit across the corresponding constant current source and the corresponding light emitting element; and
   a control circuit which monitors the voltage at each of the plurality of driving terminals, and which controls the connection state of each of the switches based upon the voltage at the corresponding driving terminal, wherein the driving circuit is monolithically integrated on a single semiconductor substrate, and
   wherein the control circuit controls the connection state of each of the switches based upon the voltage across the constant current source connected to the corresponding driving terminal, and
   wherein the control circuit includes a plurality of comparators which are respectively provided to the plurality of driving terminals, and each of which compares the voltage across the corresponding constant current source with a predetermined threshold voltage, and wherein the control circuit switches the connection state of each of the switches based upon the output of the corresponding comparator.

2. A driving circuit according to claim 1, wherein the booster circuit is a charge pump circuit having a plurality of switchable boost ratios, and wherein the control circuit switches the boost ratio of the charge pump circuit based upon the voltages at the plurality of driving terminals.

3. A driving circuit according to claim 1, wherein the booster circuit is a switching regulator, and wherein the control circuit adjusts the output voltage of the switching regulator using a feedback operation based upon the voltages at the plurality of driving terminals.

4. An electronic apparatus comprising:
a battery;
a plurality of light emitting elements; and
a driving circuit according to claim 1, which receives the voltage of the battery as the input voltage, and which drives the plurality of light emitting elements.

5. A driving circuit which drives a plurality of light emitting elements, comprising:
a plurality of driving terminals which are respectively provided to the plurality of light emitting elements, and each of which is to be connected to the anode of the corresponding light emitting element;
a booster circuit which receives an input voltage and boosts the input voltage;
a plurality of constant current sources which are respectively provided to the plurality of light emitting elements, and one terminal of each of which is connected to the respective light emitting element via the driving terminal;
a plurality of switches which are respectively provided to the plurality of constant current sources, and each of which receives the input voltage and the output voltage of the booster circuit and selectively applies a voltage selected from the input voltage and the output voltage of the booster circuit across the corresponding constant current source and the corresponding light emitting element; and
a control circuit which monitors the voltage at each of the plurality of driving terminals, and which controls the connection state of each of the switches based upon the voltage at the corresponding driving terminal, wherein the driving circuit is monolithically integrated on a single semiconductor substrate, and wherein the control circuit includes a plurality of comparators respectively provided to the plurality of driving terminals, and wherein the control circuit switches the connection state of each of the switches based upon the output of the corresponding comparator, and wherein, when the switch that corresponds to the driving terminal outputs the input voltage, the corresponding comparator compares the voltage difference between the voltage at the driving terminal and the input voltage with a predetermined first threshold voltage, and wherein, when the switch that corresponds to the driving terminal outputs the output voltage of the booster circuit, the corresponding comparator compares the voltage difference between the voltage at the driving terminal and the output voltage of the booster circuit with a predetermined second threshold voltage.

6. A driving circuit according to claim 5, wherein, when the switch outputs the input voltage, the corresponding comparator compares the voltage at the corresponding driving terminal with the voltage which has dropped from the input voltage by the predetermined first threshold voltage, and wherein, when the switch outputs the output voltage of the booster circuit, the corresponding comparator compares the voltage at the corresponding driving terminal with the voltage which has dropped from the output voltage of the booster circuit by the predetermined second threshold voltage.

7. A driving circuit according to claim 5, wherein the booster circuit is a charge pump circuit having a plurality of switchable boost ratios, and wherein the control circuit switches the boost ratio of the charge pump circuit based upon the voltages at the plurality of driving terminals.

8. A driving circuit according to claim 5, wherein the booster circuit is a switching regulator, and wherein the control circuit adjusts the output voltage of the switching regulator using a feedback operation based upon the voltages at the plurality of driving terminals.

9. An electronic apparatus comprising:
a battery;
a plurality of light emitting elements; and
a driving circuit according to claim 5, which receives the voltage of the battery as the input voltage, and which drives the plurality of light emitting elements.

* * * * *